United States Patent
Miller et al.

(10) Patent No.: US 6,350,789 B1
(45) Date of Patent: Feb. 26, 2002

(54) EXTRUDED FOAM PRODUCT WITH 134A AND ALCOHOL BLOWING AGENT

(75) Inventors: Larry Michael Miller, Tallmadge; Raymond Marshall Breindel, Hartville; Mitchell Zane Weekley, Tallmadge; Thomas Earl Cisar, Cuyahoga Falls; Kerry Jerome Prince, Akron, all of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/845,969

(22) Filed: Apr. 30, 2001

Related U.S. Application Data

(62) Division of application No. 09/640,951, filed on Aug. 17, 2000, now Pat. No. 6,274,640.

(51) Int. Cl.⁷ .................................................. C08J 9/14
(52) U.S. Cl. ............................. 521/88; 521/79; 521/98; 521/146; 521/910
(58) Field of Search ........................... 521/88, 98, 146, 521/79

(56) References Cited

U.S. PATENT DOCUMENTS

| | | | |
|---|---|---|---|
| 5,182,308 A | | 1/1993 | Voelker et al. |
| 5,434,195 A | * | 7/1995 | Imeokparia et al. ........ 521/146 |
| 5,605,937 A | * | 2/1997 | Knaus ......................... 521/60 |
| 5,650,106 A | * | 7/1997 | Paquet et al. ................. 264/53 |
| 5,688,832 A | * | 11/1997 | Paquet et al. ................. 521/79 |

FOREIGN PATENT DOCUMENTS

| | | |
|---|---|---|
| EP | 427533 A2 | 5/1991 |
| EP | 515125 A1 | 11/1992 |
| EP | 464581 B1 | 2/1995 |
| EP | 543242 B1 | 6/1996 |
| WO | WO 93/16127 | 8/1993 |
| WO | WO 94/03533 | 2/1994 |

\* cited by examiner

*Primary Examiner*—Morton Foelak
(74) *Attorney, Agent, or Firm*—Inger H. Eckert; Stephen W. Barns

(57) ABSTRACT

The present invention generally relates to methods for preparing extruded foam products and more particularly to a methods for producing such products with a blowing agent containing 134a and an alcohol.

7 Claims, No Drawings

EXTRUDED FOAM PRODUCT WITH 134A AND ALCOHOL BLOWING AGENT

CROSS REFERENCE TO RELATED APPLICATION(S)

This is a division of U.S. patent application Ser. No. 09/640,951 filed Aug. 17, 2000 U.S. Pat. No. 6,274,640 hereby incorporated by reference.

FIELD OF THE INVENTION

The present invention generally relates to methods for preparing extruded foam products and more particularly to a methods for producing such products with a blowing agent containing 134a and an alcohol.

BACKGROUND OF THE INVENTION

Extruded synthetic resinous foams are useful materials for many applications including thermal insulation, decorative purposes, packaging and the like. Extruded foams are generally made by melting a polymer with any other additives to create a polymer melt, mixing a blowing agent with the polymer melt at an appropriate temperature and pressure to produce a mixture whereby the blowing agent becomes soluble, i.e. dissolves, in the polymer melt. This mixture may then be extruded into a zone of reduced pressure so that the blowing agent becomes insoluble in the polymer melt and converts into a gas. As the blowing agent converts to a gas, bubbles are produced within the polymer melt. At this point, the polymer melt is cooled thereby producing a foam structure comprising closed cells resulting from the expansion of the blowing agent.

Traditional blowing agents used for extruded foam manufacture include chlorofluorocarbons (CFCs) and hydrochlorofluorocarbons (HCFCs). One of the advantages of CFC and HCFC blowing agents is their high solubility in a polymer melt. Higher blowing agent solubility promotes viscosity reduction when mixed with the polymer melt. In turn, lower viscosity leads to lower energy requirements for mixing. A major disadvantage to traditional blowing agents is that an increasing number of governments worldwide have mandated the elimination of CFCs and HCFCs blowing agents due to growing environmental concerns.

Accordingly, there has been a movement to replace traditional blowing agents in favor of more environmentally friendly blowing agents such as hydrofluorocarbons. Unfortunately, hydrofluorocarbons (HFCs), and in particular tetrafluoroethane (134a), have a lower solubility in polymer melts compared to traditional blowing agents. The present invention is directed, in part, to increasing the solubility of 134a in a polymer melt by addition of an alcohol.

U.S. Pat. No. 5,182,308 issued to Volker et al. ("Volker") discloses a laundry list of blowing agent compositions some of which include HFCs and alcohols. However, the blowing agent compositions of Volker produce extruded foams which have poor thermal insulating properties. Specifically, none of Volker's examples show extruded foams having a coefficient of thermal conductivity higher than 0.0376 W/mK as measured by DIN 52 612.

Applicants have surprisingly discovered that by use of a blowing agent containing only 134a and alcohol, extruded foams may be produced with superior thermal insulating properties. The extruded foams made by the present invention have a coefficient of thermal conductivity lower than 0.035 W/mK and preferably lower than 0.030 W/mK as measured by DIN 52 612.

SUMMARY OF THE INVENTION

The present invention is directed to extruded foam products and their manufacture. The extruded foam products of the present invention have a plurality of closed cells containing a gas comprising 99% by volume of 134a and have a coefficient of thermal conductivity lower than 0.035 W/mK and preferably lower than 0.030 W/mK as measured by DIN 52 612. The extruded foam products of the present invention are made with a blowing agent composition consisting of 134a and alcohol. The blowing agent composition preferably consists of 4–8 weight percent 134a and 2–5 weight percent alcohol with the weight percentage based on the total weight of the dry feed. The term "dry feed" used herein means all the materials except the blowing agent which are used to make the polymer melt which is extruded. For example, the dry feed may comprise polymer pellets, nucleating agents, plasticizers, and any other ingredients to produce the polymer melt.

DESCRIPTION OF PREFERRED EMBODIMENTS

Extruded Foam Manufacture Process

Although the blowing agent composition of the present invention may be incorporated in any process for making extruded foam products, the preferred extruded foam manufacture process comprises heating, to a first temperature, a resin mixture comprising a polymer to produce a plastified resin mixture; and thoroughly mixing a fluid blowing agent consisting of 134a and an alcohol with the plastified resin mixture under a first pressure and under conditions preventing foaming of the mixture. Once the blowing agent composition is incorporated and thoroughly mixed with the plastified resin mixture the resulting combination is referred to as a foamable gel. The foamable gel is then cooled to a second temperature (generally referred to as die melt temperature), and is extruded into a zone of reduced pressure (second pressure) resulting in foaming of the gel and formation of the desired extruded foam product.

The first temperature must be sufficient to plastify or melt the mixture. Preferably the first temperature is from 135–240° C., more preferably is from 145–210° C., and most preferably from 150–165° C. Preferably the second temperature or die melt temperature is cooler than the first temperature. The die melt temperature is preferably from 140–105° C., more preferably from 130–110° C., most preferably from about 125–115° C.

The first pressure must be sufficient to prevent prefoaming of the foamable gel which contains the blowing agent. Prefoaming involves the undesirable premature foaming of the foamable gel before extrusion into a region of reduced pressure. Accordingly, the first pressure varies depending upon the identity and amount of blowing agent in the foamable gel. In one embodiment, the first pressure is from 700–4500 psia (4.826–31.02 MPa). In another embodiment, the first pressure is from 840–4000 psia (5.791–27.57 MPa). In a preferred embodiment, the first pressure is from 1150–3500 psia (7.928–27.57 MPa). In the most preferred embodiment, the first pressure is from 2200–3495 psia (15.16–24.1 MPa).

The second pressure is sufficient to induce conversion of the foamable gel into a foam body and may be above, at, or below atmospheric pressure. In one embodiment, the second pressure is from 0–28 psia (0–193 kPa). In another embodiment, the second pressure is from 1.4–21 psia (9.652–144.7 kPa). In a preferred embodiment, the second pressure is from about 2.8–15 psia (19.30–103.4 kPa).

Polymer

Any polymer capable of being foamed may be used as the polymer in the resin mixture. The polymer may be thermoplastic or thermoset. Suitable plastics include polyolefins, polyvinylchloride, alkenyl aromatic polymers, polycarbonates, polyetherimides, polyamides, polyesters, polyvinylidene chloride, polymethylmethacrylate, polyurethanes, polyisocyanurates, phenolics, copolymers and terpolymers of the foregoing, thermoplastic polymer blends, rubber modified polymers, and the like. Suitable polyolefins include polyethylene and polypropylene, and ethylene copolymers.

A preferred thermoplastic polymer comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_2$–$C_6$ alkyl acids and esters, ionomeric derivatives, and $C_2$–$C_6$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred structures comprise substantially (i.e., greater than 95 percent) and most preferably entirely of polystyrene.

The properties of the extruded foam product can be modified by selection of the molecular weight of the polymer. For example, the preparation of lower density extruded foam products is facilitated by using lower molecular weight polymers whereas the preparation of higher density extruded foam products is facilitated by the use of higher molecular weight or higher viscosity resins.

Blowing Agent Composition

The blowing agent composition of the present invention consists of from 4 to 8 percent by weight of 134a and from 2 to 5 weight percent of an alcohol where the percent is based on the total weight of the dry feed. The alcohol may be chosen from $C_1$–$C_5$ alcohols and mixtures thereof. Examples of suitable alcohols include methanol, ethanol, propanol, isopropanol, tert-butanol, isobutanol, and mixtures thereof. Preferably, the alcohol is ethanol.

Optional Additives

Optional additives which may be incorporated in the extruded foam manufacture process include nucleating agents, infrared attenuating agents, plasticizers, flame retardant chemicals, pigments, elastomers, extrusion aids, antioxidants, fillers, antistatic agents, UV absorbers, etc.

These optional additives may be included in any amount to obtain desired characteristics of the foamable gel or resultant extruded foam products. Preferably, optional additives are added to the resin mixture but may be added in alternative ways to the extruded foam manufacture process. For example, optional additives may be incorporated before, during or after the polymerization process used to make the polymer in the resin mixture.

Examples of nucleating agents useful in the invention include talc, calcium silicate, calcium carbonate, calcium stearate, clay, silica, titanium dioxide, barium sulfate, diatomaceous earth, indigo, etc. In one embodiment, from about 0.01 to about 2 parts of nucleating agent per 100 parts of the polymer are incorporated into the foamable gel. In a preferred embodiment, from about 0.05 to about 1 part of nucleating agent per 100 parts of the polymer is incorporated into the foamable gel. Preferably, talc is added to the resin mixture as a nucleating agent in the amount of from 0.1 to 5.0 wt. % based on the polymer, preferably from 0.1 to 1.0 wt. %, and most preferably from 0.4 to 0.6 wt. %.

Plasticizers may also be added in the extruded foam manufacture process, preferably added to the foamable gel to facilitate processing of the foamable gel in an extruder. In a preferred embodiment, the plasticizer is a low molecular weight resin (molecular weight below about 20,000). Examples of plasticizers include liquid paraffin or white oil, hydrogenated coconut oil, esters of $C_4$–$C_{20}$ monoalcohols, diols, glycerine with higher fatty acids, styrene resin, vinyl toluene resin, alpha-methylstyrene resin, etc. In one embodiment, from about 0.1 to about 20 parts of plasticizer per 100 parts of the polymer is incorporated into the foamable gel. In a preferred embodiment, from about 1 to about 15 parts of plasticizer per 100 parts of the polymer are incorporated into the foamable gel.

Flame-retardant chemicals may also be added in the extruded foam manufacture process, preferably added to the foamable gel to impart flame retardant characteristics to the resulting extruded foam products. Flame-retardant chemicals include brominated aliphatic compounds such as hexabromocyclododecane and pentabromocyclohexane, brominated phenyl ethers, esters of tatrabromophthalic acid, and combinations thereof. In one embodiment, from about 0.1 to about 5 parts of flame-retardant chemicals per 100 parts of the polymer is incorporated into the foamable gel. In a preferred embodiment, from about 0.5 to about 3 parts of flame-retardant chemicals per 100 parts of the polymer are incorporated into the foamable gel.

Extruded Foam Product Properties

The extruded foam products prepared in accordance with the invention are characterized generally as having the following characteristics.

The resultant extruded foam products generally have a relatively low density, typically less than about 3 lbs/ft$^3$ (48.0 kg/m$^3$). Density can be determined, for example, in accordance with ASTM D1622-88. In one embodiment, the extruded foam products have a density from 0.1–3.75 lbs/ft$^3$ (1.60–60.0 kg/m$^3$) In another embodiment, the extruded foam products have a density from 0.5–3.75 lbs/ft$^3$ (8.00–60.0 kg/m$^3$) In a preferred embodiment, the extruded foam products have a density from 1–3.75 lbs/ft$^3$ (16.0–60.0kg/m$^3$). In a more preferred embodiment, the extruded foam products have a density from 1.5–3.56 lbs/ft$^3$ (24.0–57.0 kg/m$^3$).

The resultant extruded foam products generally have a relatively small average cell size, typically less than about 0.4 mm. Average cell size can be determined, for example, according to ASTM D3576-77. In one embodiment, the extruded foam products have an average cell size from about 0.01 to about 0.4 mm. In another embodiment, the extruded foam products have an average cell size from about 0.05 to about 0.35 mm. In a preferred embodiment, the extruded foam products have an average cell size from about 0.1 to about 0.3 mm. In a more preferred embodiment, the extruded foam products have an average cell size from about 0.15 to about 0.25 mm.

The resultant extruded foam products generally have a relatively uniform average cell size, typically more than about 50% of the cells have a size within about 0.06 mm of the average cell size. In one embodiment, more than about 60% of the cells have a size within about 0.06 mm of the average cell size. In another embodiment, more than about 50% of the cells have a size within about 0.05 mm of the average cell size. In yet another embodiment, more than about 50% of the cells have a size within about 0.045 mm of the average cell size.

The resultant extruded foam products generally contain a major amount of closed cells and a minor amount of open cells. The relative amount of closed cells can be determined, for example, according to ASTM D2856-A. In one embodiment, more than about 70% of the cells of the resultant extruded foam products are closed cells. In another embodiment, more than about 80% of the cells of the resultant extruded foam products are closed cells. In a preferred embodiment, more than about 90% of the cells of the resultant extruded foam products are closed cells. In a more preferred embodiment, more than about 95% of the cells of the resultant extruded foam products are closed cells.

In one embodiment, the resultant extruded foam products made in accordance with the present invention have dimensional stability in any direction of about 5% or less. In another embodiment, the resultant extruded foam products made in accordance with the present invention have dimensional stability in any direction of about 4% or less. In a preferred embodiment, the resultant extruded foam products made in accordance with the present invention have dimensional stability in any direction of about 3% or less. In a more preferred embodiment, the resultant extruded foam products made in accordance with the present invention have dimensional stability in any direction of about 2% or less as measured by ASTM D-2126/C578

The invention is illustrated with reference to the examples below. In the following examples density was measured in accordance with ASTM 1622-88. Average cell size was measured in accordance with ASTM D3576-77. The coefficient of thermal conductivity was measured in accordance with DIN 52 612.

EXAMPLE

Polystyrene was fed to a co-rotating twin screw extruder at a rate of 160 kgs/hr, along with a flame retardant. Talc at 0.5 wt. %, based on the weight of polystyrene, was added as a nucleating agent. The mixture was melted in the extruder, which had been upgraded to provide more mixing, and mixed with 5.50 wt. % HFC 134a and 3.0 wt. % Ethanol based on the total weight of the dry feed (i.e. talc and polystyrene). The amps on the extruder were 58, the extruder discharge pressure was 218 bar. The resulting gel was cooled, by an increased capacity cooling system, then foamed through a die to a region of lower pressure. The pressure at the die was 90 bar. The foam panel produced had a density of 2.85 lbs/ft$^3$ (45.7 kg/m$^3$), an average cell size of 0.2 mm, and a coefficient of thermal conductivity of 0.0271 W/mK.

Comparative Example 1

Polystyrene was fed to a co-rotating twin screw extruder at a rate of 100 kgs/hr, along with a flame retardant. Talc at 0.5%, based on the weight of polystyrene, was added as a nucleating agent. The mixture was melted in the extruder, which had been upgraded to provide more mixing, and mixed with 11 wt. % HCFC 142b based on the total weight of the dry feed (i.e. talc and polystyrene). The amps on the extruder were 42.8, the extruder discharge pressure was 234 bar. The resulting gel was cooled, by an increased capacity cooling system, then foamed through a die to a region of lower pressure. The pressure at the die was 53 bar. The foam panel produced had a density of 2.52 lbs/ft$^3$ (40.4 Kg/m$^3$), an average cell size of 0.25 mm, and a coefficient of thermal conductivity of 0.025 W/mK.

Comparative Example 2

Polystyrene was fed to a co-rotating twin screw extruder at a rate of 160 kgs/hr, along with a flame retardant. Talc at 0.2%, based on the weight of polystyrene, was added as a nucleating agent. The mixture was melted in the extruder, which had been upgraded to provide more mixing, and mixed with 5.0 wt. % HFC 134a and 3.0 wt. % HFC 152a based on the total weight of the dry feed (i.e. talc and polystyrene). The amps on the extruder were 67, the extruder discharge pressure was 233 bar. The resulting gel was cooled, by an increased capacity cooling system, then foamed through a die to a region of lower pressure. The pressure at the die was 91 bar. The foam panel produced had a density of 2.75 lbs/ft$^3$ (44.0 Kg/m$^3$), an average cell size of 0.15 mm, and coefficient of thermal conductivity of 0.0271 W/mK.

What is claimed is:

1. An alkenyl aromatic thermoplastic synthetic resin foam body having a density of from 1.5–3.0 lbs/ft$^3$ (24–48 kg/m$^3$) and a dimensional stability in any direction of four percent or less as measured by ASTM 2126/C578, a coefficient of thermal conductivity lower than 0.035 W/mK as measured by DIN 52 612, the body comprising cells of which 70% are closed cells containing a blowing agent gas consisting of 134a (1,1,1,275 2 tetrafluoroethane) and alcohol.

2. The product of claim 1 comprising cells of which at least 80% are closed cells.

3. The product of claim 1 comprising cells of which at least 90% are closed cells.

4. The product of claim 1 further comprising one or more additives chosen from the group consisting of nucleating agents, infrared attenuating agents, plasticizers, flame retardant chemicals, pigments, elastomers, extrusion aids, antioxidants, fillers, antistatic agents, and UV absorbers.

5. The product of claim 1 further comprising a nucleating chosen from the group consisting of talc, calcium silicate, calcium carbonate, calcium stearate, clay, silica, titanium dioxide, barium sulfate, diatomaceous earth, indigo, and mixtures thereof.

6. The product of claim 1 further comprising a plasticizer chosen from the group consisting of liquid paraffin, hydrogenated coconut oil, esters of $C_4$–$C_{20}$ monoalcohols, diols glycerine with higher fatty acids, styrene resin, vinyl toluene resin, alpha-methylstyrene resin, and mixture thereof.

7. The product of claim 1 wherein the thermal conductivity is lower than 0.030 W/mK as measured by DIN 52 612.

* * * * *

UNITED STATES PATENT AND TRADEMARK OFFICE
CERTIFICATE OF CORRECTION

PATENT NO. : 6,350,789 B1 Page 1 of 1
DATED : February 26, 2002
INVENTOR(S) : Miller It is certified that error appears in the above-identified patent and that said Letters Patent is hereby corrected as shown below:

Column 6,
Line 41, should read:
-- by DIN 52 612, the body comprising cells of which at least 70% are --

Signed and Sealed this

Tenth Day of September, 2002

Attest:

JAMES E. ROGAN
Attesting Officer  Director of the United States Patent and Trademark Office